United States Patent
Mientkewitz et al.

(10) Patent No.: US 6,585,176 B2
(45) Date of Patent: Jul. 1, 2003

(54) PROCESS FOR INCREASING THE EFFECTIVENESS OF THE COMMINUTION OF BULK MATERIALS BY OXIDATION

(75) Inventors: Olaf Mientkewitz, Kelkheim (DE); Elke Schweers, Bad Soden (DE); Ulrich Bauer, Sulzbach (DE); Helmut Gursky, Frankfurt (DE); Hubert Müller, Frankfurt (DE); Raimo Drögemeier, Schwalbach (DE)

(73) Assignee: Siemens Axiva GmbH & Co. KG (DE)

( * ) Notice: Subject to any disclaimer, the term of this patent is extended or adjusted under 35 U.S.C. 154(b) by 119 days.

(21) Appl. No.: 09/801,422

(22) Filed: Mar. 8, 2001

(65) Prior Publication Data

US 2001/0022327 A1 Sep. 20, 2001

(30) Foreign Application Priority Data

Mar. 11, 2000 (DE) .......................... 100 12 010

(51) Int. Cl.$^7$ .............................. B02C 19/12
(52) U.S. Cl. ................. 241/1; 241/5; 241/18; 241/21; 241/22; 241/23
(58) Field of Search .................. 585/241; 241/DIG. 37, 241/30, 1, 21, 301, 5, 22, 29, 152.2, 18, 23

(56) References Cited

U.S. PATENT DOCUMENTS 5,369,215 A * 11/1994 Platz ........................ 585/241
6,060,557 A * 5/2000 Dahmen et al. ............ 524/556

FOREIGN PATENT DOCUMENTS

RU 2060882 5/1996

* cited by examiner

*Primary Examiner*—Mark Rosenbaum
(74) *Attorney, Agent, or Firm*—Connolly Bove Lodge & Hutz LLP

(57) ABSTRACT

The invention relates to a process for the comminution of bulk materials comprising synthetic polymers which do not have an elastomeric behavior by mechanical, thermal or electromagnetic loading of the bulk materials, which comprises treating the bulk materials, before and/or during the loading, with oxidants which have a redox potential of greater than 1.5 V or subjecting them to corona, UV or plasma treatment without complete oxidation of the synthetic polymer taking place.

27 Claims, 4 Drawing Sheets

PROCESS FOR INCREASING THE EFFECTIVENESS OF THE COMMINUTION OF BULK MATERIALS BY OXIDATION

The invention relates to a process for the comminution of bulk materials consisting of synthetic polymers which do not have an elastomeric behavior by mechanical, thermal or electromagnetic loading of the bulk materials.

The invention also relates to a process for the comminution of bulk materials comprising synthetic polymers which have an elastomeric behavior.

The invention relates to a process for increasing the effectiveness of the comminution of bulk materials, in particular for increasing the throughput, reducing the requisite comminution work and/or achieving particle sizes which, without this process, can only be achieved with high energy consumption, or not at all.

For many applications, it is necessary for the solids to have certain degrees of fineness. Defined particle sizes are necessary, for example, for the setting of a dissolution rate, for binding fillers in films, for the preparation of stable suspensions or for facilitating downstream processes (for example drying, mixing or conveying). One way of setting defined degrees of fineness is comminution of relatively coarse particle sizes of the solid. This is frequently also the only possibility using the means of mechanical process engineering, since the bulk material is only present in relatively coarse particle sizes owing to the production process or the genesis.

Bulk materials can only be comminuted to the requisite degrees of fineness with high energy expenditure. This is as a result of the general laws of fracture mechanics and consequently the material behavior of solids. Thus, plastic deformations increasingly occur if the particle size of the loaded particles decreases. This is due to the reduction in the number of fracture-initiating flaws which occurs with increasing fineness. During comminution, this results in the achievement of shear stresses, which result only in plastic deformation, rather than tensile stresses, which can result in brittle fractures. With decreasing particle size, plastic and/or elastic deformations increasingly also occur in substances having a material behavior which is very brittle in macroscopic terms. This phenomenon also occurs if relatively large particles are loaded in very small volume regions (microplasticity). In the case of very fine particles, there is a limit below which only plastic deformation occurs. This limit is known by the term grindability limit. Quartz exhibits this behavior at about 1 $\mu$m and calcite at about 3–5 $\mu$m under room conditions. The grindability limit under room conditions is shifted significantly toward relatively coarse particles for substances having a viscous material behavior (for example polymers). The comminution of such substances thus represents a technical problem.

Various proposals have been made for processes for the comminution of substances of this type.

In so-called cryogenic comminution, polymers are comminuted at below their glass transition temperature. The material behavior changes here from elastic-plastic to brittle. This causes a significant reduction in the grindability limit and thus in the comminution energy required. The limits of this process are in the energy consumption for cooling and in that certain substances do not exhibit a transition in the material behavior from elastic-plastic to brittle at the temperatures which can be managed in industry and are economically acceptable.

The material behavior of bulk materials changes with the load rate in comminution machines. Substances having inelastic deformation components exhibit a greater tendency toward brittle fracture at high rates. This behavior is utilized in comminution machines which stress the particles at high rates. Examples thereof are jet mills and high-speed impact mills or impact disk mills. Due to the high speeds and thus also the accelerations, the power input is, however, generally relatively high based on the throughput in such mills.

A further possibility is the use of comminution machines which enable loading of the solid by multiaxial stress states. Under certain prerequisites, multiaxial stress states can result in a change in the material behavior of the solid. The solid then exhibits brittle behavior, in contrast to elastic-plastic behavior in the case of uniaxial stress states. The use of multiaxial stress states is used in moldings or very coarse particles for recycling. In the case of smaller particles, it is not technically possible to produce multiaxial stress states. This method thus remains closed for the production of very fine particles.

In certain comminution processes, grinding auxiliaries are added to the substances to be comminuted. These grinding auxiliaries cause more effective comminution, resulting in greater degrees of fineness or a lower energy demand for the comminution. Grinding auxiliaries are only used in comminution machines which load the particles as a material bed. Use in machines in which the conditions of single-particle comminution prevail (for example hammer mills, jet mills, impact mills and impact disk mills) does not result in an improvement in the comminution action. The grinding auxiliaries influence the flow properties of the particulate system in the comminution machines. This is achieved by a change in the interaction forces (van der Waals forces, electrostatic forces and capillary adhesive forces) between the particles through adsorption of the substances at the surface of the bulk materials to be comminuted. Examples of grinding auxiliaries are stearic acid, alcohols, amines and carboxylates in the case of dry grinding and polyacrylamides, polyacrylic acids and sodium silicate in the case of wet grinding.

So-called reactive grinding is employed for facilitating or accelerating chemical reactions. The action of reactive grinding is based on the fact that freshly fractured surfaces of solids can have increased chemical activities. If a surface of this type is brought into contact with a reaction partner, reactions can proceed more quickly or be better controlled compared with a surface which has not been freshly fractured. The aim of reactive grinding is controlled generation of defined chemical compounds with a certain yield by known chemical reactions. Reactive grinding does not have the aim of achieving certain degrees of fineness.

The document RU 2060882 C1 describes the digestion of used, metal-reinforced rubber products for recycling. A feature of the process described therein is the use of ozone. The aim of the process described is the separation of metal and rubber and not the generation of a certain degree of fineness of the end product.

The processes introduced for the generation of large degrees of fineness each have specific disadvantages for the comminution of materials having a viscous material behavior. The invention therefore had the object of increasing the effectiveness of the comminution of bulk materials. This applies both to the generation of particle sizes which cannot be generated using other processes and the increase in the throughput together with a reduction in the requisite comminution work.

This object is achieved in accordance with the invention by treating the bulk materials to be comminuted, before or during the loading, with oxidants which have an oxidation potential of greater than or equal to 1.5 V or subjecting them to corona, UV or plasma treatment. During this treatment, the bulk materials can be stationary or agitated.

The invention therefore relates to a process for the comminution of bulk materials comprising synthetic polymers which do not have an elastomeric behavior by mechanical, thermal or electromagnetic loading of the bulk materials, which comprises treating the bulk materials, before and/or during the loading, with oxidants which have a redox potential of greater than 1.5 V or subjecting them to corona, UV or plasma treatment without complete oxidation of the synthetic polymers taking place.

The invention likewise relates to a process for the comminution of bulk materials comprising synthetic polymers which have an elastomeric behavior by mechanical, thermal or electromagnetic loading of the bulk materials, which comprises treating the bulk materials, before and/or during the loading, with oxidants selected from the group consisting of permanganic acid, hydrogen peroxide, silver salts, peroxydisulfuric acid, ozone, atomic oxygen or fluorine without complete oxidation of the synthetic polymer taking place.

It is also possible for one or more of the features disclosed herein, in each case alone or in combination with other disclosed features, to represent inventive solutions to the object on which the invention is based, and it is also possible for these features to be combined as desired.

This treatment of the surfaces of bulk materials often results, surprisingly, in an increase in the effectiveness in the comminution of the bulk materials. This is evident firstly from increased generation of extremely fine particles and an increase in the throughput through a given comminution machine and thus a reduction in the power input necessary. The treatment of only a thin surface layer of the bulk materials ensures that complete oxidation does not occur. There are a multiplicity of ways of implementing the treatment of the surfaces of bulk materials in equipment terms, which will be explained in greater detail below.

In the treatment with oxidants, gaseous, liquid, solid or solvent-dissolved oxidants or oxidant mixtures are brought into contact with the bulk material. The physical treatment of the surfaces can take place by UV radiation, corona treatment or plasma treatment.

The treatment of bulk materials, prior to the comminution, with a gaseous, liquid or solvent-dissolved oxidant or oxidant mixture is preferably carried out in a stationary or agitated bed or in a fluidized bed. The oxidant here flows through the bed or fluidized bed. In the case of a fluidized bed, the inflow is from below. In a fluidized bed, the contact between oxidant and solid is more intensive than in a fixed bed, but is also more difficult to achieve. As a consequence of possible electrostatic charging and the consequent risk of explosion in the case of flammable products with gaseous oxidants, and in the case of sufficiently small particle size distributions, however, it is frequently necessary to employ a fixed bed. The fluidized bed or fixed bed may, in accordance with the invention, be operated either batchwise or continuously. In accordance with the invention, temperatures of from −196° C. to 400° C., preferably from 10 to 30° C., are maintained during the treatment with gaseous and liquid oxidants or oxidant mixtures or dissolved oxidants. The process can, in accordance with the invention, be used at any pressure, preferably at from 0.5 to 2 bar absolute, at contact times of the oxidant with the solid in the range from 1 s to 600 min, preferably from 1 min to 30 min, and concentrations of the oxidant in the case of dissolved oxidants in the range from 0.001 to 100%, preferably from 0.5 to 10%. After the treatment of the solid with the oxidant, the bulk material is comminuted with input of energy. The energy input may be of a mechanical, thermal or electromagnetic nature. It is possible, for example, to employ all mills in accordance with the prior art. Use can be made, for example, of jet mills, high-speed impact mills, disk mills or hammer mills.

The treatment of the bulk material, before the comminution, with a solid oxidant is preferably carried out in a suitable solids mixer or in a fluidized bed. Examples of solids mixers which can be employed are shear mixers, throw mixers or intensive mixers, and other designs. In accordance with the invention, temperatures of from −196° C. to 400° C., preferably from 10 to 30° C., are maintained during the treatment with solid oxidants or oxidant mixtures. The process can be carried out in accordance with the invention at any pressure, preferably from 0.5 to 2 bar absolute, at contact times of the oxidant with the solid in the range from 1 s to 600 min, preferably from 1 min to 30 min, and an amount of from 0.0001 g of oxidant per kg of bulk material to 0.5 kg of oxidant per kg of bulk material. After the treatment of the bulk material with the oxidant, the bulk material is comminuted as after treatment with gaseous or liquid oxidants (see above). Before or after a treatment, it may be necessary for unconsumed oxidant to be separated off from the bulk material. The separation here can be carried out in accordance with the prior art in classification machines (for example sieve machines or classifiers) or grading machines (for example density grading machines, magnetic separators or electrostatic separators).

The contacting of the bulk material to be comminuted with the oxidant during the comminution is carried out, for example, in appropriately customized comminution machines. A possible risk of dust explosion as a consequence of electrostatic charging or as a consequence of flying sparks due to fast-moving machine parts must be taken into account in the case of gaseous oxidants.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawings wherein similar reference characWrs refer to similar parts and in which.

Figure 1:
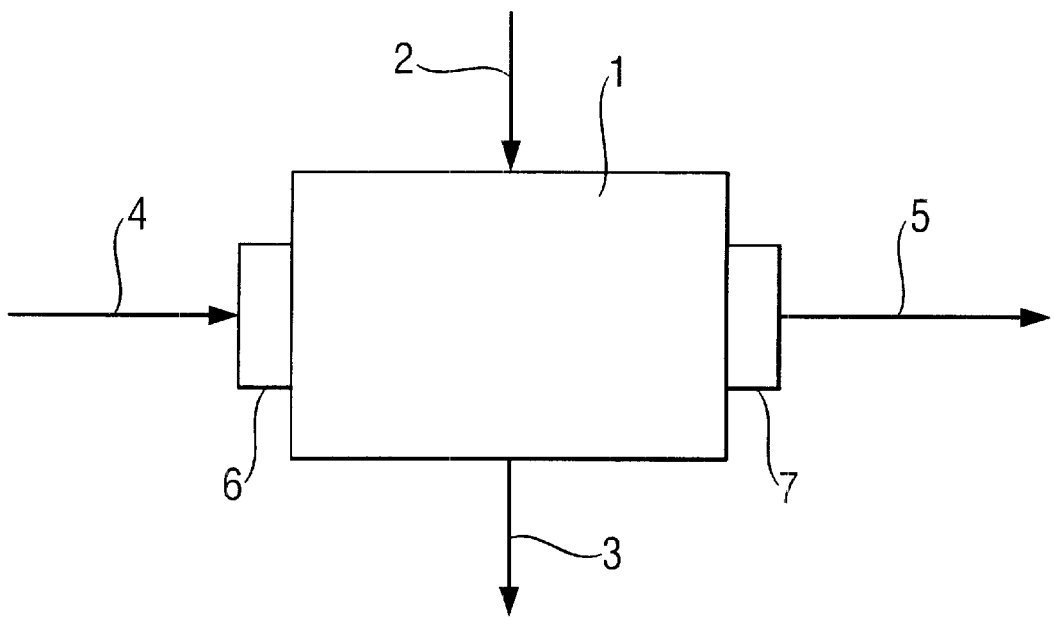
FIG. 1 is a flow diagram showing treatment of bulk material, according to the present invention.

One possibility for the novel treatment of the bulk material with the oxidant during the comminution is to pass gaseous or liquid oxidants through a drum mill 1 filled with the material to be ground, as shown diagrammatically in FIG. 1. Preference is given here to batch operation, since in this case easily implemented sealing of the oxidant-rinsed grinding chamber from the environment is possible. The introduction 2 and discharge 3 of the oxidant can take place via corresponding rotary lead-throughs in the faces of the drum mill. Continuous introduction 4 and discharge 5 of the bulk material is achieved in accordance with the invention by employing a bulk-material lock 6 in accordance with the prior art before the mill and a further bulk-material lock 7 in accordance with the prior art after the drum mill. Bulk-material locks which can be employed are, for example, star wheels or star feeders, and other designs.

The contacting of the bulk material with solid oxidants during the comminution can be achieved in accordance with the invention by, for example, mixing the oxidant with the bulk material upstream of the comminution machine or metering the oxidant into the comminution machine. The mixing of the bulk material can be carried out in all solids mixers in accordance with the prior art. The separation of unconsumed oxidant is carried out in the same way as for the separation of solid oxidants before the comminution (see above).

For certain bulk materials, it is advantageous to treat the bulk material with the oxidant before and during the comminution. Different oxidants can be employed in accordance with the invention for the treatment before and during the comminution.

Synthetic organic substances can be comminuted particularly well in accordance with the invention. Examples of polymeric organic substances which can be comminuted in accordance with the invention are: cellulose derivatives, polyacetylene, polyacrylates, polyamides, polyaromatic compounds, polyesters, polyethers, polyketone, polyolefins, polyurethanes, polyvinyl compounds, and copolymers and mixtures of these plastics.

The invention also relates to bulk materials, powders and particle systems prepared in this way.

The invention is explained in greater detail with reference to the following examples:

EXAMPLE 1

Figure 2:
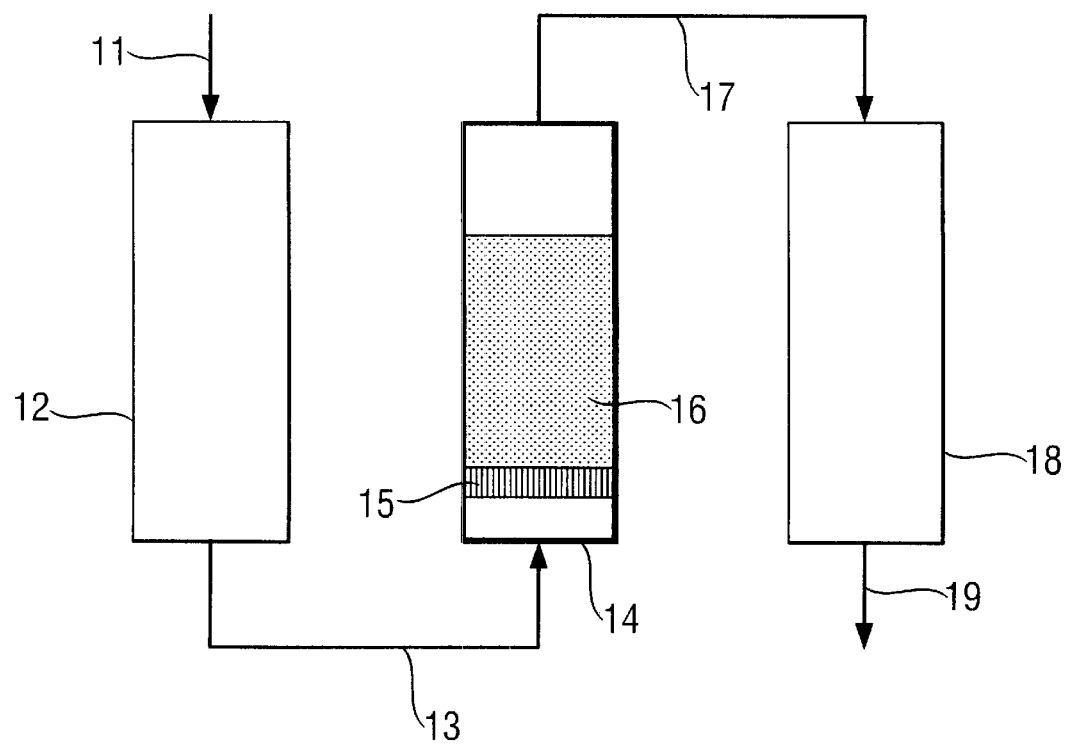
FIG. 2 is a flow diagram of a plant process, according to the present invention.
Figure 3:
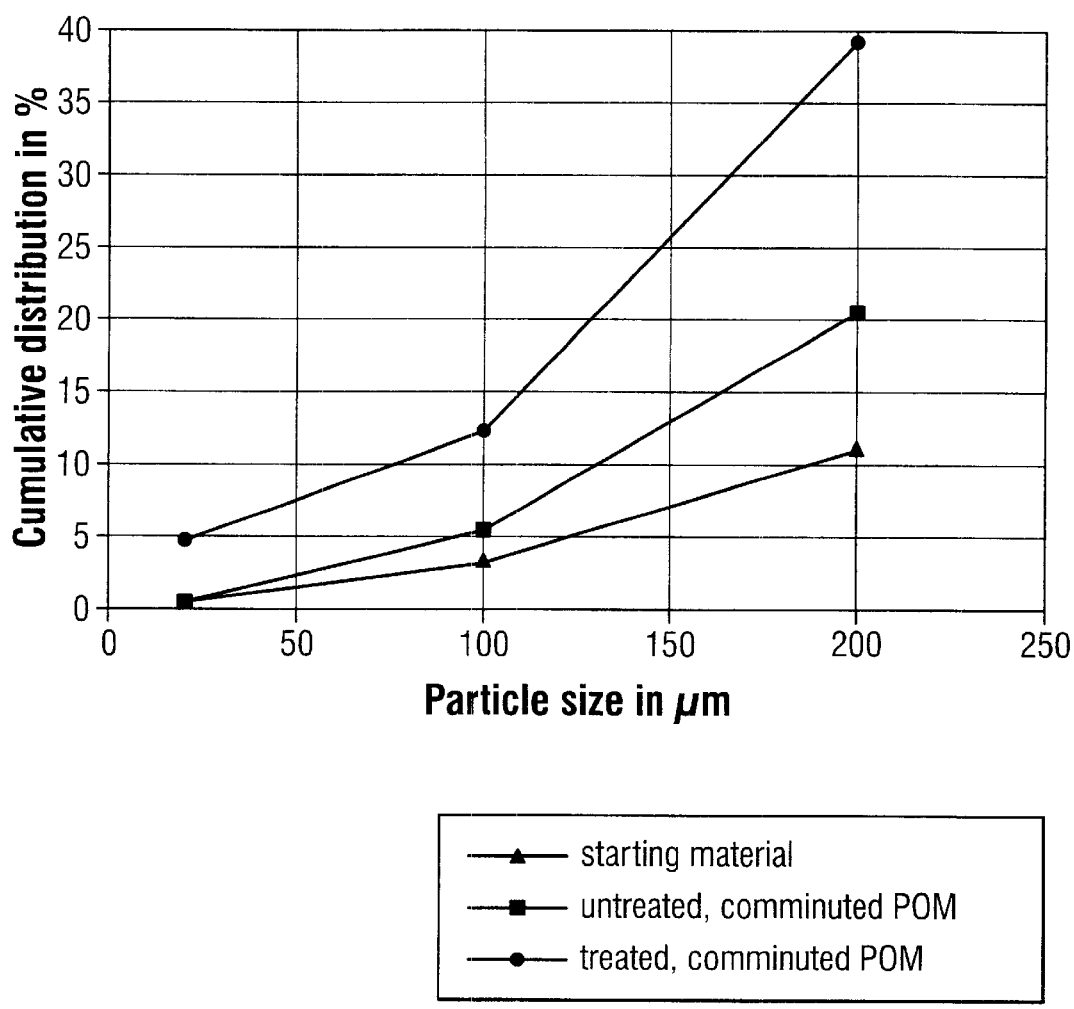
FIG. 3 is a graph of particle size of starting material and of treated and untreated comminuted POM versus cumulative distribution, according to the present invention.

In a plant as shown in FIG. 2, having an ozone generator 12, glass pipe 14 with frit base 15 and ozone filter 18, which is connected to the glass pipe 14 via a pipe 17, a polyoxymethylene (POM) 16 is treated with ozone. The glass pipe 14 has a diameter of 100 mm. Air 11 is passed into the ozone generator, and, after the ozone filter, the air 19 is blown out of the plant again. The particle size distribution of the starting material is shown in FIG. 3. The POM 16 is introduced into the glass pipe, and the treatment is carried out by introducing the ozone/air mixture 13 into the fixed bed from below. The gas velocity is 0.01 m/s, the temperature is 25° C., the pressure is 1 bar and the ozone concentration is 1.6 g/m$^3$. The treatment time is 30 min. After the treatment, the POM 16 is removed from the glass pipe 14 and comminuted in a hammer mill (manufacturer: Retsch, model DR 75, sieve insert: 0.5 mm) at a throughput of 100 g/min. The particle size distribution generated is shown in FIG. 3. For comparison, the particle size distribution of the untreated POMs comminuted in the hammer mill under the same parameters is also plotted on the diagram. The effect of the treatment on the comminution result is clearly evident. In contrast to the untreated POM, the treated POM is comminuted more finely in the hammer mill.

EXAMPLE 2

Figure 4:
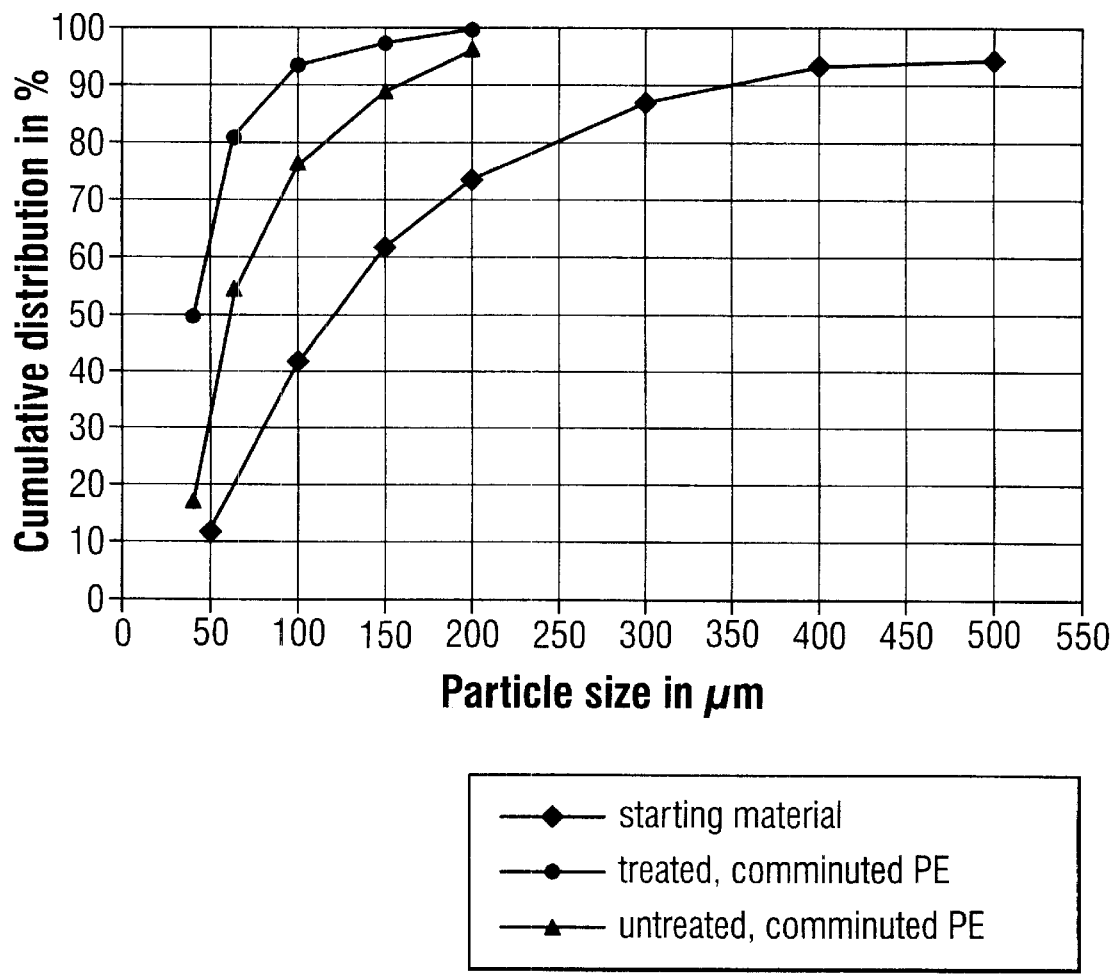
FIG. 4 is a graph of particle size of starting material and of treated and untreated comminuted PE versus cumulative distribution, according to the present invention.

In a plant as shown in FIG. 2, consisting of ozone generator, glass pipe with frit base and ozone filter, a polyethylene (PE) is treated with ozone. The particle size distribution of the starting material is shown in FIG. 4. The PE is introduced into the glass pipe, and the treatment is carried out by introducing an ozone/oxygen mixture into the fixed bed from below. The gas velocity is 0.02 m/s, the temperature is 25° C., the pressure is 1 bar and the ozone concentration is 1.6 g/m$^3$. The treatment time is 60 min. After the treatment, the PE is removed from the glass pipe and comminuted in a jet mill (manufacturer: Micro-Macinazione SA, model Chrispo-Jet 200, grinding chamber diameter: 200 mm, gas pressure: 6 bar) at a throughput of 0.4 kg/h. The particle size distribution generated is shown in FIG. 4. For comparison, the particle size distribution of the untreated PE comminuted in the jet mill under the same parameters is likewise plotted on the diagram. The effect of treatment on the comminution result is clearly evident.

What is claimed is:

1. A process for the comminution of bulk materials comprising synthetic polymers which do not have an elastomeric behavior, the process comprising the steps of:
    (a) treating a thin surface layer of the bulk materials with oxidants having a redox potential of greater than 1.5 V or subjecting them to corona, UV or plasma treating without complete oxidation of the synthetic polymers taking place; and
    (b) simultaneously or thereafter comminuting the bulk materials by mechanical, thermal, or electromagnetic loading.

2. The process as claimed in claim 1, wherein the or each oxidant is used in gaseous form.

3. The process as claimed in claim 2, wherein the contacting of the or each oxidant with the bulk material is carried out in a fluidized bed before, during or before and during the comminution.

4. The process as claimed in claim 2, wherein the contacting of the or each oxidant with the bulk material is carried out in a fixed bed before the comminution.

5. The process as claimed in claim 2, wherein the contacting of the or each oxidant with the bulk material is carried out in a solids mixer before the comminution.

6. The process as claimed in claim 5, wherein the contacting of the or each oxidant with the bulk material is carried out in a screw mixer, plowshare mixer, shear mixer, paddle mixer, intensive mixer or free-fall mixer before the comminution.

7. The process as claimed in claim 1, wherein the or each oxidant is used in liquid form.

8. The process as claimed in claim 1, wherein the or each oxidant is used in solid form.

9. The process as claimed in claim 1, wherein the or each oxidant is used dissolved in a solvent.

10. The process as claimed in claim 1, wherein mixtures of oxidants are used.

11. The process as claimed in claim 1, wherein permanganic acid, hydrogen peroxide, silver salts, ozone, peroxydisulfuric acid, atomic oxygen or fluorine is used as oxidant.

12. The process as claimed in claim 11, wherein ozone is used as oxidant at a temperature of from −196° C. to 400° C.

13. The process as claimed in claim 12, wherein ozone is used as oxidant at a temperature of from 10° C. to 30° C.

14. The process as claimed in claim 11, wherein ozone is used as oxidant at a pressure of from 0.1 bar to 20 bar.

15. The process as claimed in claim 14, wherein ozone is used as oxidant at a pressure of 0.9 bar.

16. The process as claimed in claim 11, wherein ozone as oxidant is brought into contact with the solid for a time of from 1 second to 600 min.

17. The process as claimed in claim 16, wherein ozone as oxidant is brought into contact with the solid for a time of from 15 min to 30 min.

18. The process as claimed in claim 11, wherein ozone is used as oxidant in oxygen or air.

19. The process as claimed in claim 18, wherein ozone is used as oxidant in a concentration of from 0.01 g/m³ to 500 g/m³.

20. The process as claimed in claim 19, wherein ozone is used as oxidant in a concentration of from 0.5 g/m³ to 10 g/m³.

21. The process as claimed in claim 1, wherein the comminution of the treated solid is carried out by impact, shear or pressure.

22. The process as claimed in claim 21, wherein the comminution of the treated solid is carried out in a jet mill or impact disk mill.

23. The process as claimed in claim 1, wherein cellulose derivatives, polyacetylene, polyacrylates, polyamides, polyaromatic compounds, polyesters, polyethers, polyketone, polyolefins, polyurethanes, polyvinyl compounds, or copolymers or mixtures of these plastics, are comminuted.

24. The process as claimed in claim 1, wherein bulk materials, powders or particulate systems are comminuted.

25. A process for the comminution of bulk materials comprising comminuting synthetic polymers by mechanical, thermal or electromagnetic loading of the bulk materials, which comprises subjecting the bulk materials to corona treatment before and/or during the loading.

26. A process for the comminution of bulk materials comprising comminuting synthetic polymers by mechanical, thermal or electromagnetic loading of the bulk materials, which comprises subjecting the bulk materials to plasma treatment before and/or during the loading.

27. A process for the comminution of bulk materials comprising synthetic polymers which have an elastomeric behavior, the process comprising the steps of:

(a) treating a thin surface layer of the bulk materials with oxidants selected from the group consisting of permanganic acid, hydrogen peroxide, silver salts, peroxydisulfuric acid, atomic oxygen and fluorine without complete oxidation of the synthetic polymers taking place; and (b) simultaneously or thereafter comminuting the bulk materials by mechanical, thermal, or electromagnetic loading.

* * * * *